US012044248B2

(12) United States Patent
Ding

(10) Patent No.: US 12,044,248 B2
(45) Date of Patent: Jul. 23, 2024

(54) HIDING FAN AND FAN LAMP

(71) Applicants: SUZHOU OPPLE LIGHTING CO., LTD., Suzhou (CN); OPPLE LIGHTING CO., LTD., Shanghai (CN)

(72) Inventor: Junguang Ding, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/081,788

(22) Filed: Dec. 15, 2022

(65) Prior Publication Data

US 2023/0124160 A1 Apr. 20, 2023

Related U.S. Application Data

(63) Continuation of application No. PCT/CN2021/101777, filed on Jun. 23, 2021.

(30) Foreign Application Priority Data

Jun. 29, 2020 (CN) ......................... 202010605965.0
Jun. 29, 2020 (CN) ......................... 202021226811.9

(51) Int. Cl.
*F04D 29/36* (2006.01)
*F04D 25/08* (2006.01)
(Continued)

(52) U.S. Cl.
CPC ........... *F04D 29/36* (2013.01); *F04D 25/088* (2013.01); *F21V 23/003* (2013.01); *F21V 33/0096* (2013.01)

(58) Field of Classification Search
CPC .......... F04D 29/34; F04D 29/36; F04D 29/38; F04D 25/088
See application file for complete search history.

(56) References Cited

U.S. PATENT DOCUMENTS 1,445,402 A * 2/1923 Le Velle ............... F04D 29/364 415/141
1,458,348 A * 6/1923 Le Velle ............... F04D 25/088 416/87
(Continued)

FOREIGN PATENT DOCUMENTS

CN 204084292 U 1/2015
CN 205447512 U 8/2016
(Continued)

OTHER PUBLICATIONS

International Search Report of PCT Application No. PCT/CN2021/101777 dated Sep. 26, 2021 with English translation, (4p).

*Primary Examiner* — Woody A Lee, Jr.
*Assistant Examiner* — Cameron A Corday
(74) *Attorney, Agent, or Firm* — Arch & Lake LLP

(57) ABSTRACT

The present disclosure discloses a hiding fan, the hiding fan includes a turntable, a plurality of fan blades, and a synchronization mechanism, the synchronization mechanism includes a rotation ring and a plurality of connection rods, the rotation ring is mounted on the turntable, the rotation ring can rotate relative to the turntable around a central axis of the turntable, each fan blade has an installation end and a free end, the installation end has an installation portion and a connection portion, the installation portion is mounted on the turntable through a first rotation connection portion, a first end of the connection rod is mounted on the turntable on the rotation ring through a second rotation connection portion, a second end of the connection rods is mounted on
(Continued)

the connection portion, the fan blade can rotate around a central axis of the first rotation connection portion.

12 Claims, 5 Drawing Sheets

(51) Int. Cl.
*F21V 23/00* (2015.01)
*F21V 33/00* (2006.01)

(56) References Cited

U.S. PATENT DOCUMENTS

| | | | | |
|---|---|---|---|---|
| 2,079,942 | A * | 5/1937 | Le Velle | F04D 29/364 416/143 |
| 8,851,841 | B2 * | 10/2014 | Care | F04D 29/366 416/5 |
| 2003/0223869 | A1 | 12/2003 | Wu | |
| 2006/0140769 | A1 * | 6/2006 | Frampton | F04D 25/088 416/210 R |

FOREIGN PATENT DOCUMENTS

| | | | |
|---|---|---|---|
| CN | 208057504 | U | 11/2018 |
| CN | 208831329 | U | 5/2019 |
| CN | 111577658 | A | 8/2020 |
| CN | 212479689 | U | 2/2021 |

* cited by examiner

HIDING FAN AND FAN LAMP

CROSS-REFERENCE TO RELATED APPLICATIONS

This application is based upon and claims the priority of PCT patent application No. PCT/CN2021/101777 filed on Jun. 23, 2021 which claims priority to the Chinese patent application No. 202010605965.9 filed on Jun. 29, 2020, and the Chinese patent application No. 202021226811.0 filed on Jun. 29, 2020, the entire contents of which are hereby incorporated by reference herein for all purposes.

TECHNICAL FIELD

The present disclosure relates to the technical field of fans, in particular to a hiding fan.

BACKGROUND

The hiding fan expands the fan blades when in use, and fold the fan blades when not in use, to avoid dust accumulation on the fan blades. The hiding fan has a plurality of fan blades, and the plurality of fan blades are connected to each other through a synchronization mechanism such as a gear mechanism and a link mechanism, and the like, so that each fan blade rotates synchronously.

SUMMARY

The present disclosure discloses a hiding fan and a fan lamp.

According to a first aspect, the present disclosure provides a hiding fan. The hiding fan may include a turntable, a plurality of fan blades, and a synchronization mechanism, the synchronization mechanism comprises a rotation ring and a plurality of connection rods, a total number of the connection rods is equal to a total number of the fan blades, the rotation ring is mounted on the turntable, the rotation ring is configured to rotate relative to the turntable around a central axis of the turntable, the fan blade has an installation end and a free end, the installation end has an installation portion and a connection portion that are spaced apart from each other, the installation portion is mounted on the turntable through a first rotation connection portion, a first end of the connection rod is mounted on the turntable on the rotation ring through a second rotation connection portion, a second end of the connection rod is mounted on the connection portion through a third rotation connection portion, the fan blade is configured to rotate around a central axis of the first rotation connection portion, and the fan blade is configured to switch between a storage position and a unfolded position by rotating.

According to a second aspect, the present disclosure provides a fan lamp which may include a lamp assembly, a motor assembly and an hiding fan according to the above descriptions, the lamp assembly is arranged on the side of the turntable facing away from the fan blades, the motor assembly is arranged on the side of the turntable facing the fan blades, and the rotating ring is sleeved on the outer periphery of the motor assembly.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and constitute a part of the present disclosure; the examples of the present disclosure and their descriptions are used to explain the present disclosure without constituting any limitation thereto. In the attached image.

DETAILED DESCRIPTION

Figure 1:
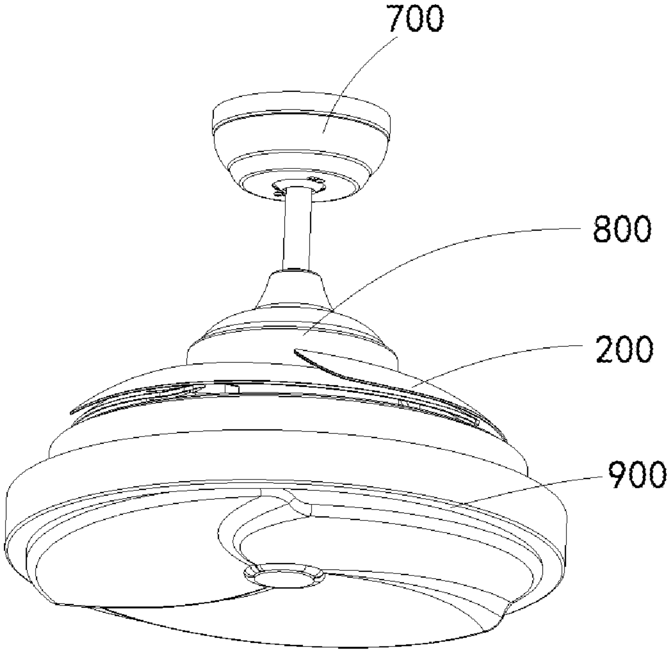
FIG. 1 is a schematic diagram of a fan lamp disclosed by an example of the present disclosure, in which the fan blades are in a storage position.

In order to make objectives, technical solutions and advantages of the present disclosure more clearly, the technical solutions of the present disclosure will be described in a clearly and fully understandable way in connection with the examples of the present disclosure and the corresponding drawings. The described examples are just a part but not all of the examples of the present disclosure. Based on the described examples herein, those skilled in the art can obtain other example(s), without any inventive work, which should be within the scope of the present disclosure.

Description of reference signs used in this disclosure may include:

100—turntable, 110—central opening, 120—the third position limit structure, 130—annular installation seat, 131—the first position limit structure, 140—fan blade installation portion, 200—fan blade, 210—installation portion, 220—connection portion, 230—the fourth position limit structure, 300—synchronization mechanism, 310—rotation ring, 311—connection rod installation portion, 312—the second position limit structure, 320—connection rod, 400—first rotation connection portion, 500—second rotation connection portion, 600—the third rotation connection portion, 700—installation assembly, 710—driver, 720—hanger, 730—installation house, 800—motor assembly, 810—motor cover, 820—driver motor, 900—lamp assembly, 910—lamp plate, 920—light source module, 930—lamp shade, L1—the first distance, L2—the second distance, L3—the third distance.

The structure of the certain synchronization mechanism is relatively complicated, and once the size of the fan blade is adjusted, the synchronization mechanism needs to be replaced as a whole, which leads to high design cost and manufacturing cost of the hiding fan, and is not conducive to the subsequent maintenance of the hiding fan.

Therefore, it would be desirable to have a hiding fan that overcomes or at least alleviates the above-mentioned deficiencies.

The technical solutions disclosed in the various examples of the present disclosure are described in detail below in conjunction with the drawings.

An example of the present disclosure discloses a hiding fan. Referring to FIG. 1 to FIG. 8, the hiding fan includes a turntable 100, a plurality of fan blades 200 and a synchronization mechanism 300.

The synchronization mechanism 300 includes a rotation ring 310 and a plurality of connection rods 320. The number of the connection rods 320 is equal to the number of the fan blades 200. The rotation ring 310 is mounted on the turntable 100, and the rotation ring 310 is configured to rotate relative to the turntable 100 around the central axis of the turntable 100.

Each fan blade 200 has an installation end and a free end, the installation end has an installation portion 210 and a connection portion 220 that are spaced apart from each other, the installation portion 210 is mounted on the turntable 100 through the first rotation connection portion 400; a first end of the connection rod 320 is mounted on the turntable 100 on the rotation ring 310 through a second rotation connection portion 500, a second end of the connection rod 320 is mounted on the connection portion 220 through a third rotation connection portion 600; the fan blades 200 is configured to rotate around the central axis of the first rotation connection portion 400, and the fan blades 200 is configured to switch between the storage position and the unfolded position by rotating.

In the hiding fan disclosed in the present disclosure, the plurality of fan blades 200 are connected to each other through a synchronization mechanism 300, so that each fan blade 200 is synchronously unfolded, or, synchronously folded and stored; the synchronization mechanism 300 includes a rotation ring 310 and a connection rod 320; for hiding fans of different sizes, it is only required to change the size of the connection rod 320, so that the same rotation ring 310 can adapt to hiding fans of different sizes, reducing the design cost and manufacturing cost of the hiding fan, and facilitating the subsequent maintenance of the hiding fan.

Figure 5:
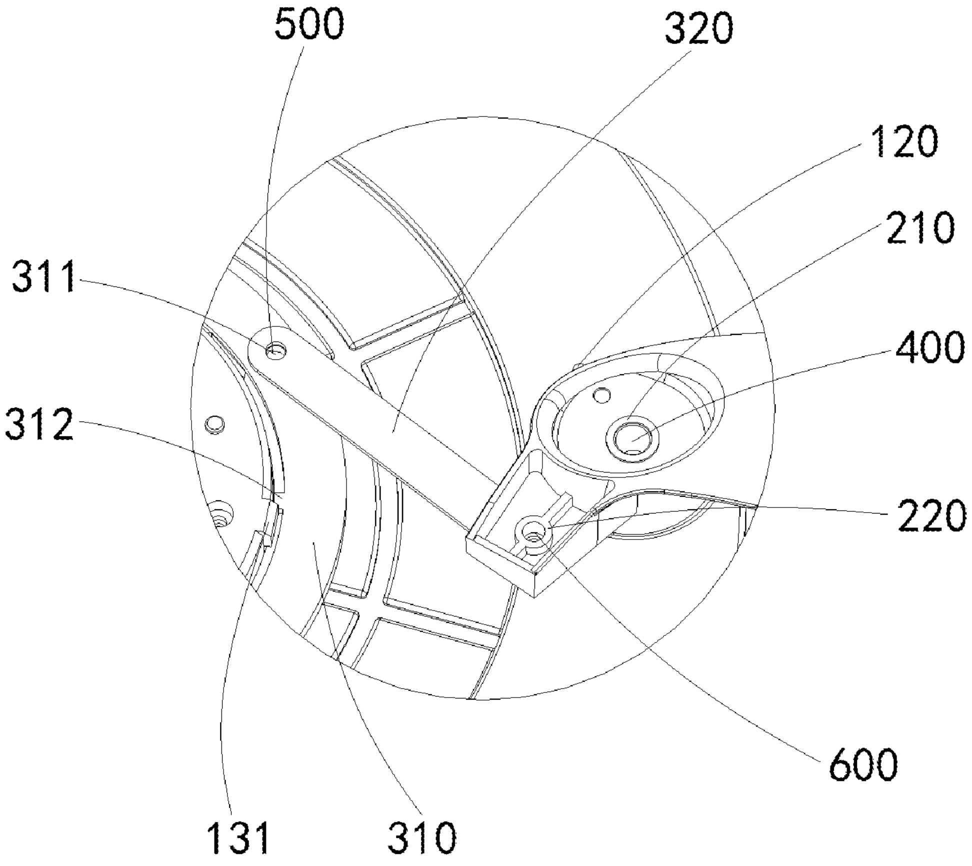
FIG. 5 is a partial enlarged schematic diagram of an A portion of the hiding fan shown in FIG. 4.
Figure 6:
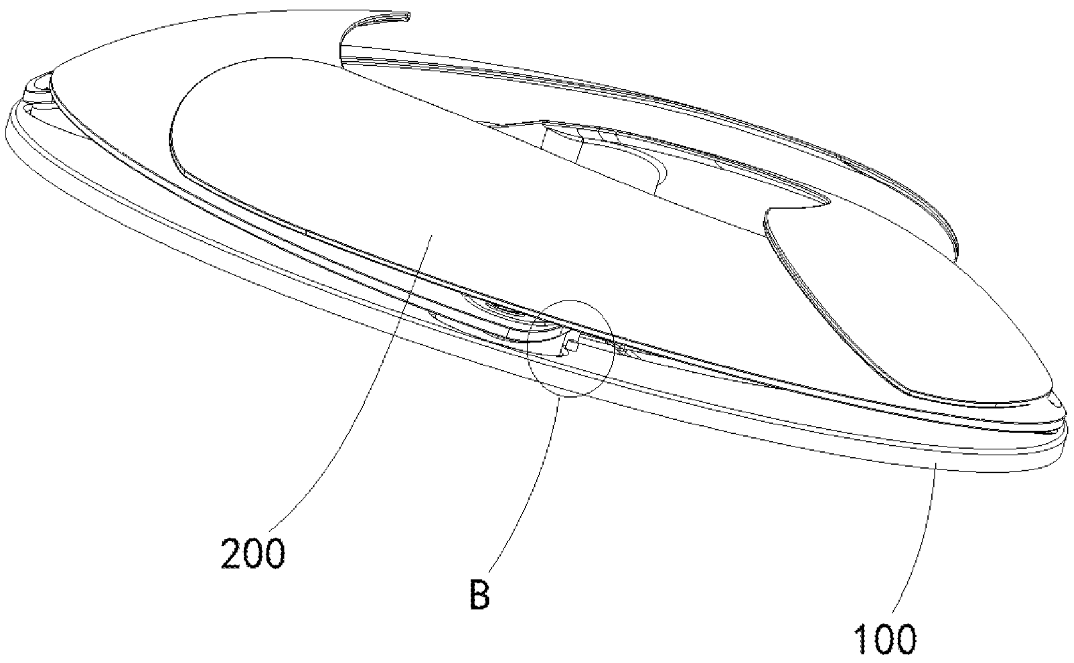
FIG. 6 is a schematic diagram of the hiding fan shown in FIG. 4, in which the fan blades are in the storage position.
Figure 7:
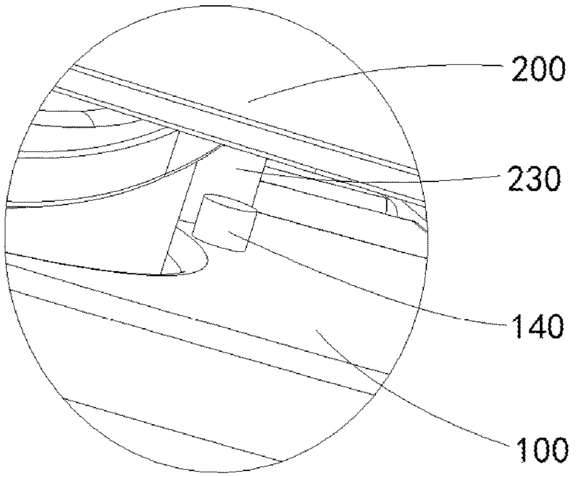
FIG. 7 is a partial enlarged schematic diagram of a B portion of the hiding fan shown in FIG. 6.
Figure 8:
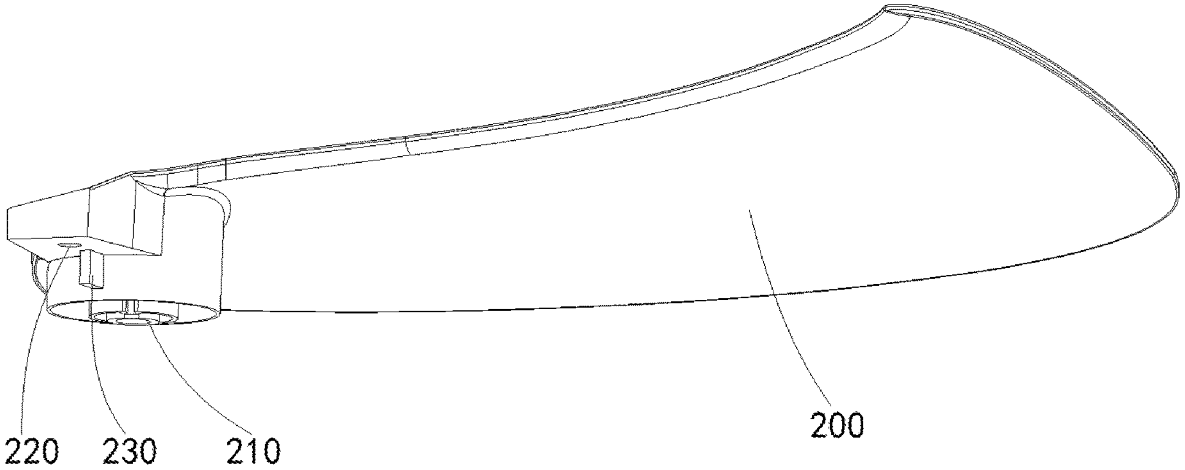
FIG. 8 is a schematic diagram of the fan blades of the hiding fan shown in FIG. 5.

The structures of the first rotation connection portion 400, the second rotation connection portion 500 and the third rotation connection portion 600 may be appropriately selected according to actual needs. Referring to FIG. 5, in at least one example of the present disclosure, the turntable 100 has a plurality of fan blade installation portions 140, and the plurality of fan blade installation portions 140 are evenly spaced apart from each other along a circumferential direction of the turntable 100; the first rotation connection portion 400 includes a first rotation shaft, and the installation portion 210 is mounted on the fan blade installation portion 140 through the first rotation shaft. The rotation ring 310 has a plurality of connection rod installation portions 311, and the plurality of the connection rod installation portions 311 are evenly spaced apart from each along a circumferential direction of the rotation ring 310; the second rotation connection portion 500 includes a second rotation shaft, and the first end of the connection rod 320 is mounted on the connection rod installation portions 311 through the second rotation shaft. The third rotation connection portion 600 includes a third rotation shaft, and the second end of the connection rod 320 is mounted on the connection portion 220 through the third rotation shaft. The first rotation connection portion 400, the second rotation connection portion 500 and the third rotation connection portion 600 have simple structures, which is convenient for the assembly of the hiding fan.

Figure 2:
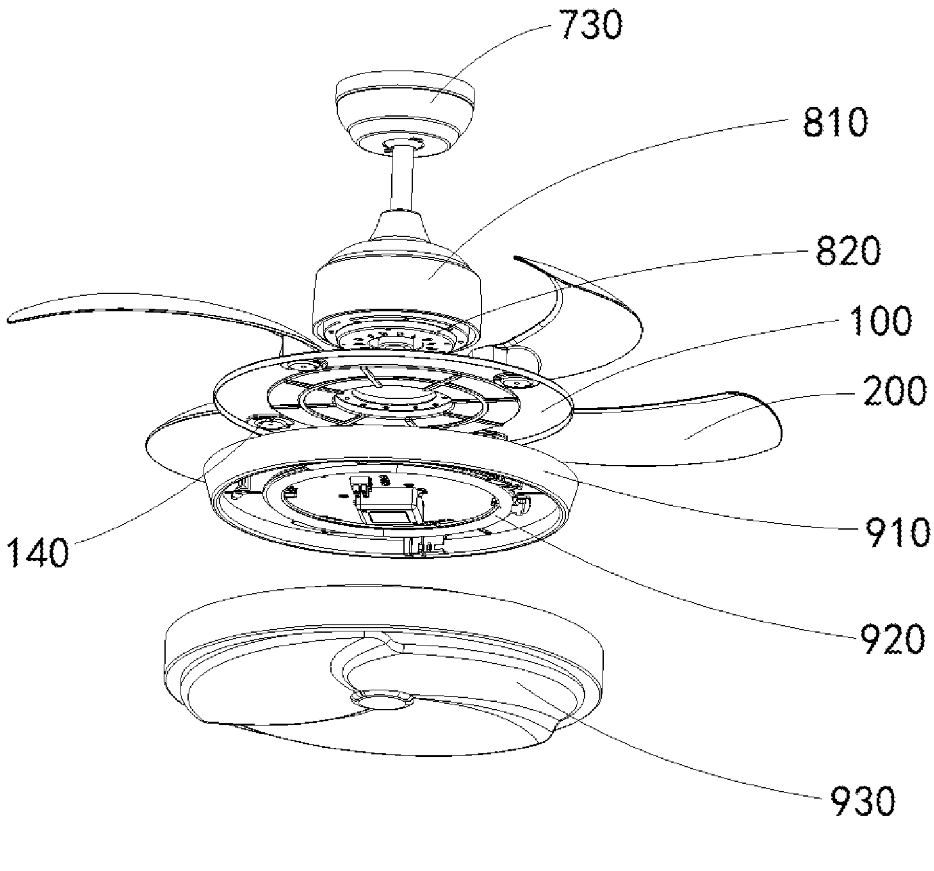
FIG. 2 is an exploded view of the fan lamp shown in FIG. 1, where the fan blades are in a unfolded position.
Figure 4:
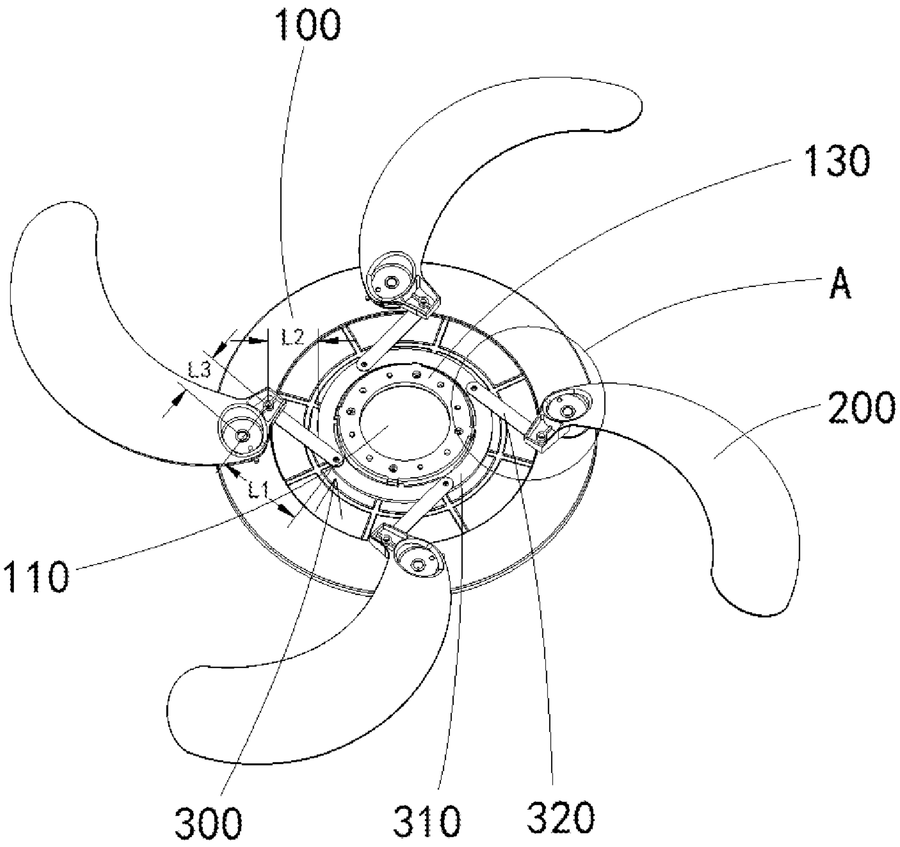
FIG. 4 a schematic diagram of a hiding fan disclosed according to an example of the present disclosure, where the fan blades are in the unfolded position.

Optionally, referring to FIG. 2, FIG. 4 and FIG. 5, along the circumferential direction of the turntable 100, the plurality of connection rod installation portions 311 are alternately arranged with the plurality of fan blades installation portions 140; the intervals between the connection rod installation portions 311 and the fan blade installation portions 140 are increased, which is convenient for the arrangement of the connection rods 320, helps the fan blades 200 to switch smoothly between the storage position and the unfolded position, and makes the structure of the hiding fan more compact.

Referring to FIG. 4 again, in the example of the present disclosure, along a length direction of the connection rod 320, a distance between the second rotation connection portion 500 and the third rotation connection portion 600 is a first distance L1; in the case where the fan blades 200 are in the unfolded position, along a radial direction of the turntable 100, a distance between the second rotation connection portion 500 and the third rotation connection portion 600 is a second distance L2; and the first distance L1 is greater than the second distance L2. Because the first distance L1 is greater than the second distance L2, the extending direction of the connection rod 320 does not coincide with the radial direction of the turntable 100 during the entire movement process of the connection rod 320, so that a link mechanism constituted by the fan blades 200, connection rods 320, the rotation ring 310 and the turntable 100 moves to the dead center. A distance between the first rotation connection portion 400 and the third rotation connection portion 600 is a third distance L3, and preferably, the third distance L3 is smaller than the first distance L1, so that the structure of the hiding fan is more compact.

Optionally, the hiding fan has a position limit structure, and the position limit structure includes a unfolded position limit portion and a storage position limit portion, so that the fan blade 200 can only rotate between the unfolded position and the storage position, so as to prevent the rotation of the fan blades 200 from exceeding an expected range and improve the stability and reliability of the hiding fan. The specific structure of the position limit structure may be appropriately selected according to actual needs, for example, an arc-shaped positon limit groove is provided on the rotation ring 310, and the turntable 100 has a protrusion block inserted into the arc-shaped positon limit groove; in the case where the fan blades 200 are in the unfolded position, the protruding block abuts against one end of the arc-shaped limiting slot; in the case where the fan blades 200 are in the storage position, the protruding block abuts against the other end of the arc-shaped limiting slot.

Referring to FIG. 5 to FIG. 8, in at least one example of the present disclosure, the unfolded position limit portion includes a first position limit structure 131 and a second position limit structure 312 that cooperate with each other, and the storage position limit portion includes a third position limit structure 120 and a fourth position limit structure 230 that cooperate with each other; the first position limit structure 131 and the third position limit structure 120 are arranged on the turntable 100, the second position limit structure 312 is arranged on one selected from the group consisting of the rotation ring 310 and the fan blades 200, the fourth position limit structure 230 is arranged on the other selected from the group consisting of the rotation ring 310 and the fan blades 200. The storage position limit portion and the unfolded position limit portion are separated from each other, so as to avoid the simultaneous failure of the storage position limit portion and the unfolded position limit portion, and so that the space required for the arrangement of the storage position limit portion and the unfolded position limit portion which are arranged separately is smaller, which makes the structure of the hiding fan more compact.

Optionally, the turntable 100 includes an annular installation seat 130, the rotation ring 310 is sleeved on the outer side of the annular installation seat 130; the first position limit structure 131 is arranged on the annular installation seat 130, the second position limit structure 312 is arranged on the rotation ring 310; the first position limit structure 131 is a first position limit protrusion protruding toward the rotation ring 310 along a radial direction of the turntable 100, and the second position limit structure 312 is a second position limit protrusion protruding toward the annular installation seat 130 along the radial direction of the turntable 100; in the case that the fan blades 200 are in the unfolded position, the first position limit protrusion and the second position limit protrusion abut against each other, so as to prevent the fan blades 200 from continuing to rotate toward the direction which makes the fan blades 200 be unfolded.

The fourth position limit structures 230 are respectively arranged on the fan blades 200, the third position limit structure 120 is a third position limitation protrusion protruding toward the fan blades 200 along a thickness direction of the turntable 100, and the fourth position limit structure 230 a fourth position limitation protrusion protruding toward the turntable 100 along a thickness direction of the turntable 100. In the case where the fan blades 200 are in the storage position, the third position limitation protrusion and the fourth position limitation protrusion abut against each other, so as to prevent the fan blades 200 from continuing to rotate toward the direction which makes the fan blades 200 be folded and stored. The above-mentioned unfolded position limit portion and storage position limit portion are simple in structure, require less space for arrangement, and facilitate the arrangement of the position limit structure.

Optionally, the hiding fan further includes an elastic reset member (not shown in the figures), the elastic reset member includes a first installation portion and a second installation portion; the first installation portion is fixed relative to the turntable 100, and the second installation portion is fixed relative to the fan blades 200. The elastic reset member applies an elastic force to the fan blades 200 to keep the fan blades 200 in the storage position; once the fan blades 200 stop rotating, they will return to the storage position under the action of the elastic force of the elastic reset member. Specifically, when the hiding fan is started, the fan blade 200 starts to rotate under the driving of the driver motor 820, and the centrifugal force of the fan blades 200 overcomes the elastic force of the elastic reset member, so that the fan blades 200 automatically stretch to the unfolded position; when the hiding fan is closed, the fan blades 200 stop rotating, the centrifugal force disappears, and the fan blades 200 are reset to the storage position under the action of the elastic force of the elastic reset member.

Figure 3:
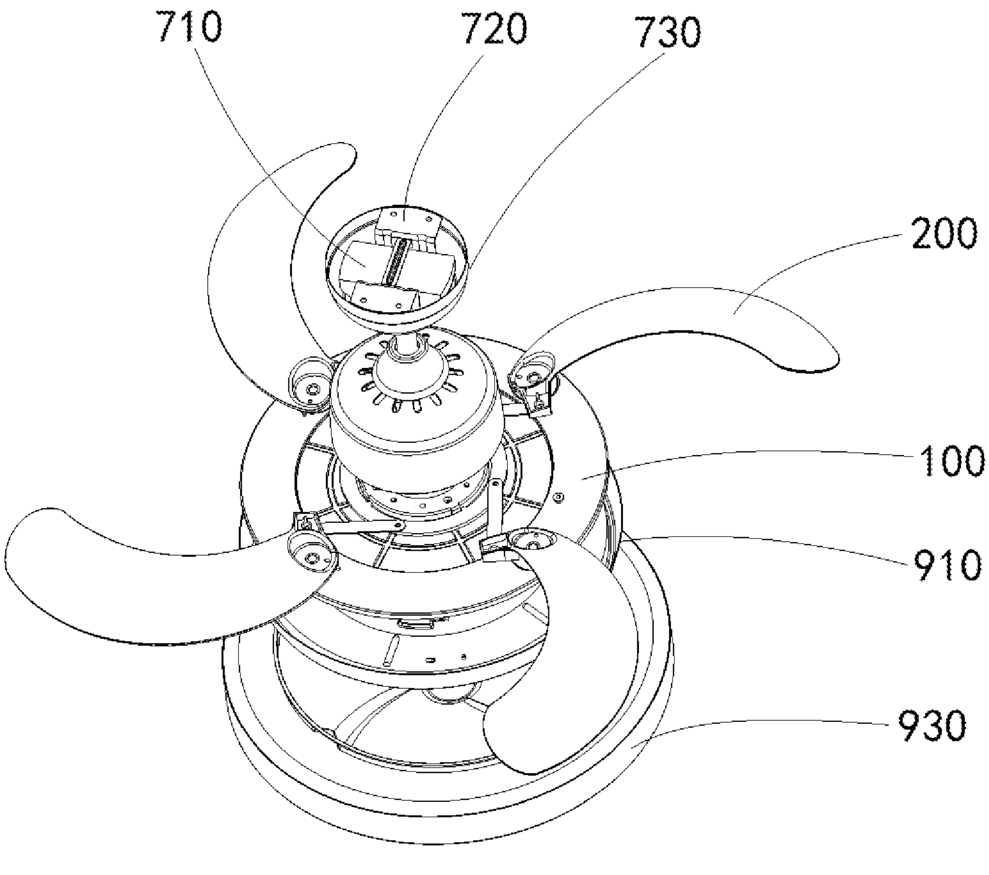
FIG. 3 is another exploded view of the fan lamp shown in FIG. 1, where the fan blades are in the unfolded position.

The example of the present disclosure also discloses a fan lamp, referring to FIG. 1 to FIG. 3, the fan lamp includes a lamp assembly 900, a motor assembly 800 and the hiding fan described above; the lamp assembly 900 is arranged on the side of the turntable 100 away from the fan blades 200, the motor assembly 800 is arranged on the side of the turntable 100 facing the fan blades 200, and the rotation ring 310 is sleeved on the outer periphery of the motor assembly 800; the fan lamp has the same advantages as the above-mentioned hiding fan, and the same advantages are not repeated here.

Optionally, the fan lamp includes a driver 710; the driver 710 is electrically connected to the motor assembly 800 through a first electrical connector, and the driver 710 is electrically connected to the lamp assembly 900 through a second electrical connector. The motor assembly 800 and the lamp assembly 900 for driving the fan blade 200 may be electrically connected with the same driver 710, so that the hiding fan and the lamp assembly 900 can be driven by the same one driver 710; compared with the way in which the hiding fan and the lamp assembly 900 are respectively driven by their respective drivers, the number of parts and components of the fan lamp disclosed in the examples of the present disclosure is reduced, so the fan lamp occupies a smaller space and, meanwhile, facilitates the transportation of the fan lamp.

In the example of the present disclosure, the motor assembly 800 includes a motor cover 810 and a driver motor 820 mounted in the motor cover 810; the motor cover 810 can protect the driver motor 820 and make the appearance of the fan lamp more beautiful. The driver motor 820 may be connected to the turntable 100 by transmission in any appropriate manner; in the examples of the present disclosure, the driver motor 820 is fixedly mounted on the annular installation seat 130, and the annular installation seat 130 has a central opening 110 in the middle to reduce the weight of the turntable 100 and avoid interference between the turntable 100 and the driver motor 820.

The specific structure of the lamp assembly 900 may be appropriately selected according to the usage requirements. Optionally, the lamp assembly 900 includes a lamp plate 910, a light source module 920 and a lamp shade 930.

Further, referring to FIG. 3, the fan lamp includes an installation assembly 700, the installation assembly 700 includes an installation house 730 and a hanger 720 fixedly mounted in the installation house 730, and the driver 710 is fixedly connected to the hanger 720, which facilitates the installation and fixation of the driver 710, and the installation house 730 can protect the driver 710.

The present disclosure discloses a hiding fan, aiming at solving the problems that the existing hiding fan has high design cost and manufacturing cost, and is not conducive to subsequent maintenance.

To solve the above problems, the present disclosure adopts the following technical scheme:

a hiding fan comprises a turntable, a plurality of fan blades, and a synchronization mechanism, the synchronization mechanism comprises a rotation ring and a plurality of connection rods, a total number of the connection rods is equal to a total number of the fan blades, the rotation ring is mounted on the turntable, the rotation ring is configured to rotate relative to the turntable around a central axis of the turntable, the fan blade has an installation end and a free end, the installation end has an installation portion and a connection portion that are spaced apart from each other, the installation portion is mounted on the turntable through a first rotation connection portion, a first end of the connection rod is mounted on the turntable on the rotation ring through a second rotation connection portion, a second end of the connection rod is mounted on the connection portion through a third rotation connection portion, the fan blade is configured to rotate around a central axis of the first rotation connection portion, and the fan blade is configured to switch between a storage position and a unfolded position by rotating.

A fan lamp comprises a lamp assembly, a motor assembly and an hiding fan according to the above descriptions, the lamp assembly is arranged on the side of the turntable facing away from the fan blades, the motor assembly is arranged on the side of the turntable facing the fan blades, and the rotating ring is sleeved on the outer periphery of the motor assembly.

The technical scheme adopted by the present disclosure can achieve the following beneficial effects:

in the hiding fan disclosed by the present disclosure, each fan blade is connected with each other through the synchronization mechanism, so that each fan blade can be synchronously unfolded, or, folded and stored; the synchronization mechanism comprises a rotation ring and a connection rod; for hiding fans with different sizes, only the size of the connection rod needs to be changed, so that the same rotation ring can be applied to hiding fans with different sizes, the design cost and manufacturing cost of the hiding fan are reduced, and the subsequent maintenance of the hiding fan is facilitated.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In the above examples of the present disclosure, the focus is on the differences between the various examples. As long as the different optimization features among the various examples are not contradictory, they may be combined to form another example. For purpose of writing concisely, it is not repeated here.

The above are merely particular examples of the present disclosure but are not limitative to the present disclosure. For those skilled in the art, the present disclosure may have many modifications and variations. Those modifications, substitutions and improvements made in the spirit and principle of the present disclosure should be encompassed by the present disclosure.

What is claimed is:

1. A hiding fan, comprising:

a turntable, a plurality of fan blades, and a synchronization mechanism, wherein:

the synchronization structure comprises a rotation ring and a plurality of connection rods, a total number of the connection rods is equal to a total number of the fan blades, the rotation ring is mounted on the turntable, the rotation ring is configured to rotate relative to the turntable around a central axis of the turntable, each of the fan blades has an installation end and a free end, the installation end has an installation portion and a connection portion that are spaced apart from each other, the installation portion is mounted on the turntable through a first rotation joint, a first end of the each of the connection rods is mounted on the turntable on the rotation ring through a second rotation joint, a second end of the each of the connection rods is mounted on the connection portion through a third rotation joint, the each of the fan blades is configured to rotate around a central axis of the first rotation joint, and the each of the fan blades is configured to switch between a storage position and a unfolded position by rotating, wherein the hiding fan comprises a position limit structure, the position limit structure comprises an unfolded position limiter and a storage position limiter, the unfolded position limiter comprises a first position limit structure and a second position limit structure that cooperate with each other, and the storage position limiter comprises a third position limit structure and a fourth position limit structure that cooperate with each other, wherein the first position limit structure and the third position limit structure are arranged on the turntable.

2. The hiding fan according to claim 1, wherein the turntable has a plurality of fan blade installation portions, the plurality of the fan blade installation portions are evenly spaced apart from each other along a circumferential direction of the turntable, the first rotation connection portion comprises a first rotation shaft, and the installation portion is mounted on the fan blade installation portion through the first rotation shaft.

3. The hiding fan according to claim 2, wherein the rotation ring has a plurality of connection rod installation portions, the plurality of the connection rod installation portions are evenly spaced apart from each other along a circumferential direction of the rotation ring, the second rotation connection portion comprises a second rotation shaft, and the first end of the each of the fan blades is mounted on the connection rod installation portions through the second rotation shaft.

4. The hiding fan according to claim 1, wherein the third rotation connection portion comprises a third rotation shaft, and the second end of the connection rod is mounted on the connection portion through the third rotation shaft.

5. The hiding fan according to claim 3, wherein along the circumferential direction of the turntable, the connection rod installation portions are alternately arranged with the fan blade installation portions.

6. The hiding fan according to claim 1, wherein along a length direction of the connection rod, a distance between the second rotation connection portion and the third rotation connection portion is a first distance; in a case where the fan blades are in the unfolded position, along a radial direction of the turntable, a distance between the second rotation connection portion and the third rotation connection portion is a second distance, and the first distance is greater than the second distance.

7. The hiding fan according to claim 1, wherein the second position limit structure is arranged on one selected from a group consisting of the rotation ring and the fan blades, the fourth position limit structure is arranged on other one selected from the group consisting of the rotation ring and the fan blades.

8. The hiding fan according to claim 7, wherein the turntable comprises an annular installation seat, and the rotation ring is sleeved on an outer side of the annular installation seat, the first position limit structure is arranged on the annular installation seat, the second position limit structure is arranged on the rotation ring, the first position limit structure is a first position limit protrusion protruding toward the rotation ring along a radial direction of the turntable, and the second position limit structure is a second position limit protrusion protruding toward the annular installation seat along the radial direction of the turntable.

9. The hiding fan according to claim 8, wherein the fourth position limit structure is arranged on the each of the fan blades, the third position limit structure is a third position limitation protrusion protruding toward the fan blades along a thickness direction of the turntable, and the fourth position limit structure is a fourth position limitation protrusion protruding toward the turntable along the thickness direction of the turntable.

10. The hiding fan according to claim 1, wherein the hiding fan further comprises an elastic reset member, the elastic reset member comprises a first installation portion and a second installation portion, the first installation portion is fixed relative to the turntable, and the second installation portion is fixed relative to the fan blades.

11. A fan lamp, comprising a lamp assembly, a motor assembly and a hiding fan, wherein:

the hiding fan comprises a turntable, a plurality of fan blades, and a synchronization mechanism, the synchronization mechanism comprises a rotation ring and a plurality of connection rods, a total number of the connection rods is equal to a total number of the fan blades, the rotation ring is mounted on the turntable, the rotation ring is configured to rotate relative to the turntable around a central axis of the turntable, each of the fan blades has an installation end and a free end, the installation end has an installation portion and a connection portion that are spaced apart from each other, the installation portion is mounted on the turntable through a first rotation connection portion, a first end of the each of the connection rods is mounted on the turntable on the rotation ring through a second rotation connection portion, a second end of the each of the connection rods is mounted on the connection portion through a third rotation connection portion, the each of the fan blades is configured to rotate around a central axis of the first rotation connection portion, and the each of the fan blades is configured to switch between a storage position and a unfolded position by rotating, wherein the hiding fan comprises a position limit structure, the position limit structure comprises an unfolded position limiter and a storage position limiter, the unfolded position limiter comprises a first position limit structure and a second position limit structure that cooperate with each other, and the storage position limiter comprises a third position limit structure and a fourth position limit structure that cooperate with each other, wherein the first position limit structure and the third position limit structure are arranged on the turntable; and the lamp assembly is arranged on a side of the turntable away from the fan blades, the motor assembly is arranged on a side of the turntable facing the fan blades, and the rotation ring is sleeved on an outer periphery of the motor assembly.

12. The fan lamp according to claim 11, wherein the fan lamp comprises a driver, the driver is electrically connected to the motor assembly through a first electrical connector, and the driver is electrically connected to the lamp assembly through a second electrical connector.

* * * * *